R. McMILLEN.
TROLLEY.
APPLICATION FILED JULY 10, 1911.
1,019,509.
Patented Mar. 5, 1912.
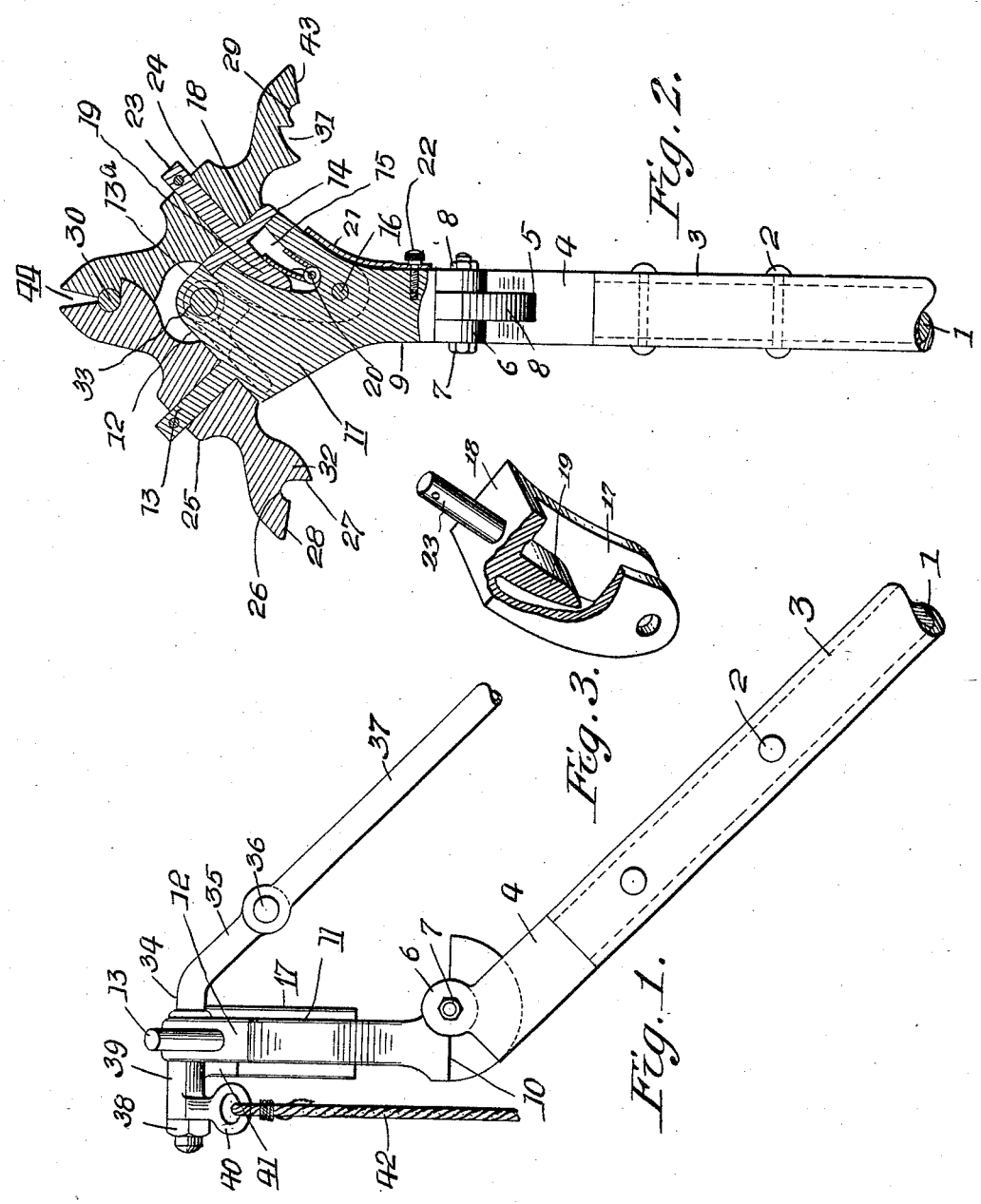
WITNESSES:
INVENTOR.
ROBERT McMILLEN.
BY
ATTORNEYS.

UNITED STATES PATENT OFFICE.

ROBERT McMILLEN, OF PITTSBURGH, PENNSYLVANIA, ASSIGNOR OF ONE-THIRD TO HORACE S. McLAUGHLIN, OF PITTSBURGH, PENNSYLVANIA.

TROLLEY.

1,019,509.  Specification of Letters Patent.  Patented Mar. 5, 1912.

Application filed July 10, 1911. Serial No. 637,821.

*To all whom it may concern:*

Be it known that I, ROBERT MCMILLEN, a citizen of the United States of America, residing at Pittsburgh, in the county of Allegheny and State of Pennsylvania, have invented certain new and useful Improvements in Trolleys, of which the following is a specification, reference being had therein to the accompanying drawing.

This invention relates to trolleys, and the object of my invention is to provide a trolley harp and wheels that can be advantageously used upon city and suburban high speed trolley lines for preventing the harp from becoming accidentally displaced due to any irregularities in a trolley wire or when curved sections of the trolley wire are encountered.

Another object of this invention is to furnish a trolley pole with a pivoted harp that is normally maintained in a vertical position and at right angles to a trolley wire, whereby the wheels of the harp can evenly travel upon the wire.

A further object of this invention is to furnish a harp with revoluble interlocking trolley wheels adapted to embrace a trolley wire, particularly the lower edge thereof and maintain a positive connection with the wire and without interfering with or injuring trolley hangers or other overhead construction.

A still further object of this invention is to furnish a trolley harp with a yieldable wheel supporting member that can be easily moved to release a trolley wire held by the wheels of the harp.

A still further object of this invention is to provide a novel trolley harp with coöperating wheels, said harp and said wheels being simple in construction, durable and highly efficient for the purpose for which they are intended.

With the above and other objects in view the invention resides in the novel construction, combination and arrangement of parts to be hereinafter specifically described and then claimed.

Reference will now be had to the drawing, wherein:—

Figure 1 is a side elevation of the trolley. Fig. 2 is a vertical cross sectional view of a portion of the same, and Fig. 3 is a perspective view of the wheel supporting member.

The reference numeral 1 denotes a portion of the trolley pole and riveted or otherwise mounted upon the upper end of the pole, as at 2 is the sleeve 3 of a harp support 4. The harp support 4 is bifurcated to form a vertical slot 5 and oppositely disposed lugs 6, said lugs being apertured to receive a bolt or pivot pin 7 which is retained in engagement with the lugs by a nut 8.

Pivotally mounted upon the bolt 7 is a semicircular tongue 8 of a harp 9, said tongue riding in the slot 5 and said harp being limited in its movement in one direction by the shoulders 10 of the harp 9 engaging the upper end of the support 4. The manner of connecting the harp 9 to the support 4 corresponds to a rule hinge. The upper end of the harp 9 has a spear-shaped head 11 presenting angularly disposed faces 12 and 13ª. The former is provided with an outwardly extending integral journal pin 13 and the latter is cut away, as at 14 and provided with a transverse tapering slot 15.

Arranged transversely of the head 11, adjacent to the lower end of the slot 15, is a transverse pin 16 and pivotally mounted upon the ends of said pin are the depending side arms 17 of a wheel supporting member 18. The head 11 is cut away, as at 14 to provide clearance for the member 18 and the arms 17 of said member are connected by a transverse web 19 extending into the slot 15. The arm 17 limiting the downward inward movement of the member 18. The web 19 is normally retained in engagement with the upper wall of the slot 15 by compression springs 20 and 21, the former being arranged in the slot 15 between the side arms 17, and the latter secured to the harp 9, by a screw 22 or other fastening means, the spring 21 engaging the edges of the side arms 17.

The wheel member 18 is provided with an outwardly integral journal pin 23 coöperating with the journal pin 13 in supporting trolley wheels 24 and 25. These wheels have the hub portions thereof bearing upon the face 12 and the member 18, and as the face 12 and the member 18 are disposed at an angle to each other, the trolley wheels will be disposed at substantially a right angle to one another. The wheel 25 has the periphery thereof shaped to provide an annular groove 26 and annular shoulders 27 and 28, the inner edges of said shoulders terminating at a groove 26.

The wheel 24 has the periphery provided with an annular groove 29 coöperating with the groove 26 in receiving a trolley wire 30. The periphery of the wheel 24 is cut away at one edge of the groove 29 to provide an annular recess 31 adapted to receive the lip 32 formed by the shoulder 27 of the wheel 25.

The apex of the head 11 is provided with a transverse opening 33 for a pin 34, said pin having the rear end thereof bent downwardly at an inclination, as at 35 and pivotally connected, as at 36 to the upper end of a brace rod 37. This rod has the lower end thereof connected to the trolley pole base of the car and is adapted to normally maintain the trolley harp at a right angle relatively to the trolley wire 30 and at an obtuse angle relatively to the pole 1. Pivotally mounted upon the forward end of the pin 34 and retained thereon by a nut 38 is the barrel 39 of a trigger 40, said trigger having an extension 41 adapted to engage the edge of one of the side walls 17, at the upper end of the member 18, whereby said member will be shifted outwardly when the trigger 40 is pulled. The pulling of the trigger is accomplished through the medium of a cable 42 attached to the outer end of the trigger.

From the foregoing it will be observed that the wheel 24 can be easily swung outwardly to release the trolley wire 30, and that the springs 20 and 21 will normally hold the trolley wheel in engagement with the wire. The trolley wheels can easily ride in engagement with each other and revolve upon the wire 30, and with the lip 32 engaging under the wire, the shoulder 27 coöperates with the grooves 26 and 29 in embracing the wire 30 during the movement of the wheels thereon. As the tendency of the trolley pole 1 is to normally exert a pressure upon the under side of the wire 30, it is practically impossible for the trolley wheels to become accidentally displaced. With the shoulder 28 of the wheel 25 disposed at an obtuse angle relatively to the shoulder 27, the said shoulder 28 coöperates with the shoulder 43 of the wheel 24 in providing an entrance slot 44 between the upper edges of the wheels, this slot facilitating the placing of the wheels in engagement with the trolley wire. The slot 44 also permits of the trolley wheels easily riding past trolley hangers, guards and rails.

What I claim is:—

1. In a trolley, a pole, a harp pivotally supported by the upper end of said pole, said harp having oppositely inclined faces, a trolley wheel mounted upon one of said faces and having the periphery provided with an annular groove to receive one side of the wire and an annular lip adjacent the groove to engage the lower surface of the wire, a wheel supporting member pivotally connected to said harp and normally retained upon the other face of said harp, a trolley wheel revolubly supported by said member and having the periphery thereof provided with a groove and a recess opposing the groove and the lip of the first mentioned wheel for embracing a trolley wire, and means including a trigger adapted to engage said member to shift the wheel thereof relatively to the other wheel.

2. In a trolley, a pole, a harp pivotally supported by the upper end of said pole, an upward and laterally inclined trolley wheel revolubly mounted upon said harp and having the periphery thereof provided with an annular groove to receive one side of the wire and an annular lip adjacent the groove to engage the lower surface of the wire, a supporting wheel member having side arms pivotally connected to said harp, a web carried by said member and extending into said harp, said arms limiting the movement of said member relatively to said harp, a trolley wheel revolubly mounted upon said member and having the periphery thereof provided with a groove and a recess opposing the groove and the lip of the first mentioned wheel for embracing a trolley wire, and means including a trigger at the upper end of said harp and adapted to engage one of the arms of said member to shift said member relatively to said harp.

3. In a trolley, a pole, a harp having a rule hinge at the upper end of said pole, an upward and laterally inclined trolley wheel revolubly mounted upon said harp and having the periphery thereof provided with an annular groove to receive one side of the wire and a lip adjacent the groove to engage the lower surface of the wire, a wheel supporting member having side arms pivotally connected to said harp and a web extending into said harp, said arms limiting the movement of said member relatively to said harp, a trolley wheel revolubly supported by said member and having the periphery thereof provided with a groove and a recess opposing the groove and lip of the first mentioned wheel for embracing a trolley wire, a pin arranged transversely of said harp, a trigger mounted upon one end of said pin and adapted to engage said member to shift said member relatively to said harp, and a brace rod connected to the opposite end of said pin.

In testimony whereof I affix my signature in the presence of two witnesses.

ROBERT McMILLEN.

Witnesses:
 MAX H. SROLOVITZ,
 H. C. EVERT.

Copies of this patent may be obtained for five cents each, by addressing the "Commissioner of Patents, Washington, D. C."